US006230092B1

(12) United States Patent
Becker et al.

(10) Patent No.: US 6,230,092 B1
(45) Date of Patent: May 8, 2001

(54) PROCESS AND DEVICE FOR CONTROLLING THE DRIVING UNIT OF A VEHICLE

(75) Inventors: Rüdiger Becker, Murr; Oliver Hörrmann, Bietigheim-Bissingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/171,404

(22) PCT Filed: Dec. 21, 1996

(86) PCT No.: PCT/DE96/02502

§ 371 Date: Oct. 16, 1998

§ 102(e) Date: Oct. 16, 1998

(87) PCT Pub. No.: WO97/39910

PCT Pub. Date: Oct. 30, 1997

(30) Foreign Application Priority Data

Apr. 20, 1996 (DE) ............................................. 196 15 806

(51) Int. Cl.[7] ..................................................... B60K 28/16

(52) U.S. Cl. ................................. 701/84; 701/1; 180/197

(58) Field of Search .................................... 701/1, 51–54, 701/84, 85, 86, 87, 101; 180/197

(56) References Cited

U.S. PATENT DOCUMENTS

| | | | | |
|---|---|---|---|---|
| 5,097,809 | | 3/1992 | Teruji et al. | 123/422 |
| 5,162,997 | * | 11/1992 | Takahashi | 701/1 |
| 5,209,203 | | 5/1993 | Kaltenbrunn et al. | 180/197 |
| 5,576,961 | * | 11/1996 | Genzel et al. | 701/101 |
| 5,906,649 | * | 5/1999 | Genzel et al. | 701/51 |

FOREIGN PATENT DOCUMENTS

| | | |
|---|---|---|
| 4041413 | 7/1991 | (DE) . |
| 4120579 | 1/1992 | (DE) . |
| 4321333 | 1/1995 | (DE) . |
| 2013937 | 8/1979 | (GB) . |
| 2253440 | 9/1992 | (GB) . |
| 2279111 | 12/1994 | (GB) . |

* cited by examiner

*Primary Examiner*—Gary Chin
(74) *Attorney, Agent, or Firm*—Walter Ottesen

(57) ABSTRACT

A method and an arrangement for controlling a drive unit of a motor vehicle are suggested wherein the torque change of the drive unit is limited by a motor control system in dependence upon at least one status information of at least one other control system.

6 Claims, 3 Drawing Sheets

PROCESS AND DEVICE FOR CONTROLLING THE DRIVING UNIT OF A VEHICLE

FIELD OF THE INVENTION

The invention relates to a method and an arrangement for controlling the drive unit of a vehicle.

BACKGROUND OF THE INVENTION

A method and an arrangement of this kind are known from DE-A-43 21 333. There, the rate of change of the speed of the torque buildup of the drive unit is limited in specific operating situations. The operating situation which is of primary importance is the transition from the overrun phase of the vehicle to the traction phase when the driver actuates the accelerator pedal. Unpleasant vibrations of the drive train of the vehicle are avoided by limiting the torque buildup of the drive unit. The limiting is here pregiven as a compromise between the vibration-reducing effect, on the one hand, and the desire to make available the torque desired by the driver with the least possible delay.

From DE-A1 28 04 444 (GB-A 20 13 937), it is known to limit the change of the duration of the fuel injection pulses. From DE-A1 41 07 115 (GB-A 22 53 440), it is known to limit the torque change during the transition from overrun operation to traction operation by an adjustment of the ignition angle in order to counter vibrations in this way. Furthermore, it is known from EP-B 441 393 (U.S. Pat. No. 5,209,203), to intervene in the torque of the drive unit for damping vibrations in the drive train in the sense of reducing the difference with the intervention being in dependence upon the difference between wheel rpm and engine rpm.

The functions illustrated in the above-mentioned documents are only examples for limiting the torque change. These functions are utilized individually or in any desired combination or in modified form in dependence upon the application. In the following, these functions and functions having comparable effect but deviating configuration are taken together as limitations of the torque change of the drive unit.

These limitations have in common that the limiting action is the result of a compromise between avoiding jolting vibrations and the desire to make available the torque with the least possible delay. The limitation in the provided operating situation is always active.

SUMMARY OF THE INVENTION

It is an object of the invention to provide measures which optimize the driving performance of a vehicle with respect to a torque change.

The driving performance of a vehicle is optimized with respect to the torque change of the drive unit with the solution according to the invention.

It is especially advantageous that, for the control of the drive unit, at least one function is influenced in accordance with the behavior of the driver. This function limits the torque change of the drive unit at least in one operating state.

It is especially advantageous that the behavior of the driver is derived from the driving performance of the transmission control (sport, economy, etc.) or from the type of driver determined by the transmission control. The driving performance is adjusted by the driver. In this way, the engine control controls the torque buildup in correspondence to the type of driver pregiven by the driver.

In this way, the torque buildup of an internal combustion machine is controlled in an advantageous manner to correspond to the behavior of the driver so that the driving performance of the vehicle is adapted to the driver.

It is especially advantageous that the driver actively has the possibility to determine the buildup of the torque and therefore the driving performance of the vehicle.

With the solution according to the invention, it is made possible that a rapid torque buildup as well as a comfortable smooth torque buildup is realized in dependence upon the type of driver.

In addition, it is advantageously possible with the winter key (which is present in transmission controls) to configure the torque buildup so smoothly that the tendency of the wheels to rotate without traction is reduced for a corresponding friction value.

A further advantageous supplement is that information as to a control intervention into the brake system of the vehicle is evaluated and is transmitted to the engine control so that the torque change is slowed by the engine control. The information is supplied by a control unit controlling the drive slip of a vehicle. The disturbing, rapid torque change during intervention into the drive slip control is avoided.

BRIEF DESCRIPTION OF THE DRAWINGS

The invention will be explained in greater detail in the following with respect to the embodiments shown in the drawing.

DESCRIPTION OF THE PREFERRED EMBODIMENTS OF THE INVENTION

Figure 1:
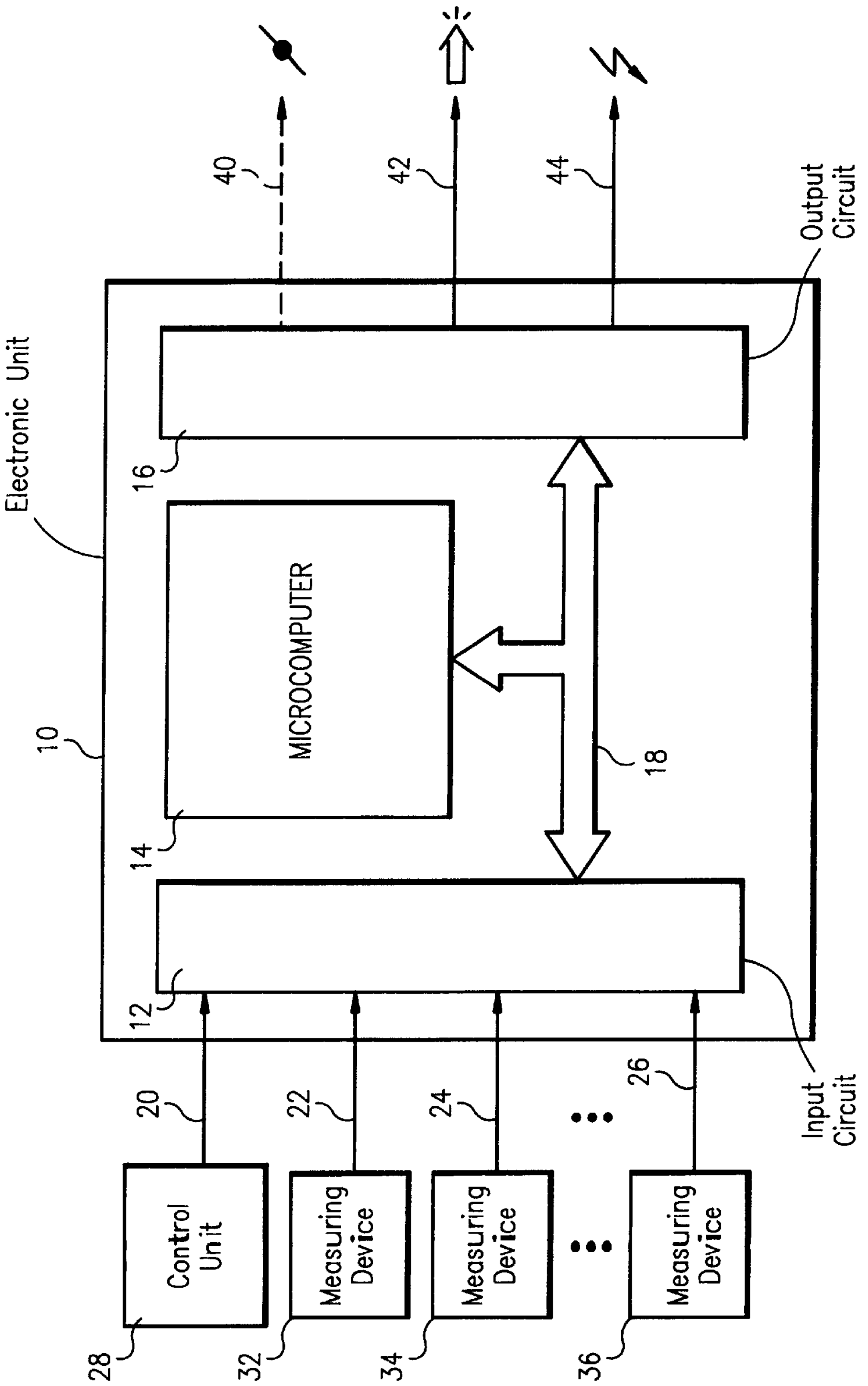
FIG. 1 shows an overview circuit diagram of an embodiment of a control of a drive unit; whereas, in FIG. 2, a preferred embodiment of the solution according to the invention is illustrated in the form of a flowchart.

In FIG. 1, an electronic unit 10 is shown which includes an input circuit 12, at least one microcomputer 14, as well as an output circuit 16. Input circuit, output circuit and the microcomputer are logically connected to each other via a communication system 18 for the mutual exchange of data and information. The input lines 20, 22 and 24 to 26 are put together, as may be required, in a bus system (for example, CAN). These input lines lead to the input circuit 12 of the control unit 10. These lines come from at least: a further control unit 28 for controlling an automatic transmission and/or a control unit for controlling the drive slip; a measuring device 32 for detecting the degree of actuation of an operator-control element 20 and from measuring devices 34 to 36 for detecting additional operating variables of the drive unit and/or of the vehicle such as engine rpm, engine temperature, engine load, et cetera. The control unit for the engine, the transmission and/or a drive slip control can be realized together as a so-called power train control unit. The control unit 10 influences the torque of the drive unit (not shown) via the output circuit 16. In the preferred embodiment of an internal combustion engine, the control unit 10 influences, as required, the air supply to the engine (symbolized by the output line 40), the fuel metering (symbolized by the output line 42) and/or the ignition angle (symbolized by the output line 44).

In a preferred embodiment, the microcomputer 14 determines a desired value for a torque of the drive unit from the degree of actuation of the operator-controlled element as well as other operating variables such as the engine rpm. This desired value is converted into drive signals for influencing parameters, which control the torque, in the sense of an approximation of the actual torque to the desired torque. This conversion is done while considering the actual torque of the drive unit. The desired torque, the so-called driver command, is filtered with a view to reducing vibrations in the drive train of the vehicle, that is, an increase in the desired torque is limited. Correspondingly, the torque buildup is limited when the operator-controlled element is actuated, for example, from the released position. Furthermore, the microcomputer 4 can also include additional programs which lead to a limiting of the torque change such as limiting the rate of change of speed of the throttle flap adjustment, the fuel injection pulses and/or programs which influence the torque of the drive unit in a manner to reduce vibration when there is a detected torque fluctuation.

To optimize driving performance of the vehicle with respect to torque changes, the torque change, especially the torque buildup, is controlled in dependence upon variables which are supplied to the engine control from other control systems which do not directly control the drive unit. These other control systems include, for example, a transmission control and/or a control unit for drive slip control. It is especially provided to apply information as to driver performance for the control of the torque change in the engine control. For a transmission control, the driver performance such as "economy", "sport", or "winter" are pregiven by the driver. This information is transmitted via an interface to the engine control. The engine control now selects the procedure corresponding to the driver performance. For example, a rapid torque buildup is desired for a sport setting which provides the driver with a spontaneous impression of the engine; whereas, for an economy setting, an improvement of the driving comfort and a reduction of the fuel consumption is most important. This means that here the priority is on a soft torque buildup. For a set "winter key", each torque pulse is damaging because the drive wheels tend to slip without traction for corresponding friction values. For this reason, the torque change is slow for a "winter" setting.

In adaptive transmission controls, a factor is derived from the operating variables which factor represents the particular type of driver.

A further important information in dependence upon which the engine control influences the torque change is, in an advantageous embodiment, the information as to control interventions of a drive slip control at the brake of the vehicle. This information is supplied from a corresponding control unit of the engine control. If the drive slip control is engaged, then any spontaneous torque change is disturbing. For this reason, and according to the invention, the torque change, which is pregiven by the driver, is only soft when a corresponding intervention signal is present, that is, the torque change is converted with a relatively large change limitation.

Figure 2:
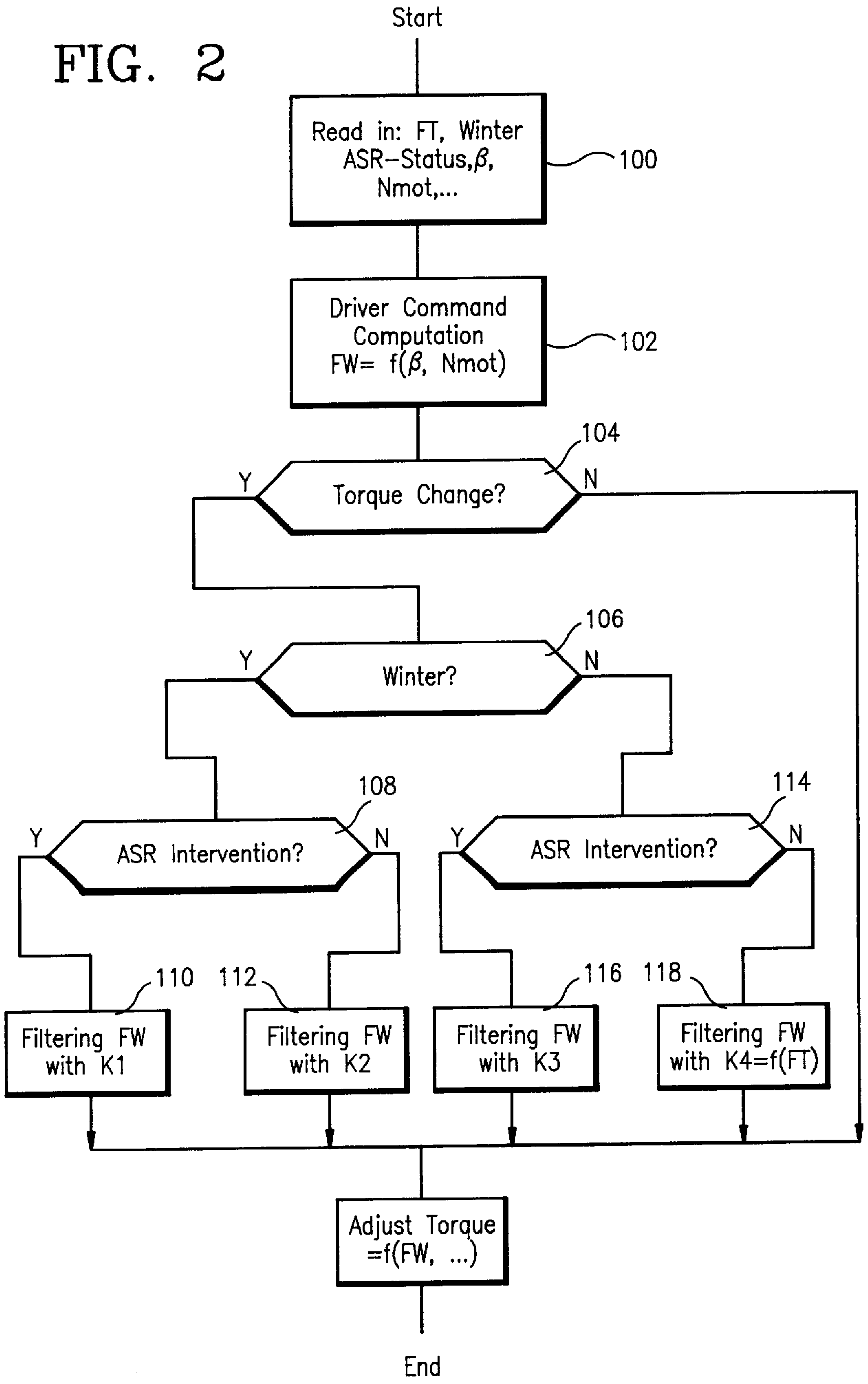

The solution of the invention is shown in a preferred embodiment with respect to the flowchart of FIG. 2. The subprogram described in FIG. 2 is initiated in pregiven time intervals, such as a few milliseconds. The subprogram describes the control of the limiting of the rate of change of the speed of the driver command derived from the actuation of the operator-controlled element. Correspondingly, this control can be applied to all other limitations implemented in the engine control.

In a first step 100, the relevant operating variables are read in. These operating variables include the following: the specific driver command FW which is determined at least on the basis of the degree of actuation $\beta$ and the engine rpm $N_{mot}$ from pregiven characteristic fields, tables or computations in another subprogram; preferably a desired torque as well as the information from other control systems such as a driver type signal FT; or information as to the transmission setting undertaken by the driver, whether economy, sport or winter setting were selected; or, in an advantageous embodiment, information as to the status of a drive slip control. In the next step 104, a check is made as to whether a torque change is pregiven by the driver, that is, in a preferred embodiment, whether the driver command has correspondingly changed. Here, in the preferred embodiment, it is provided that in step 104 only an inquiry as to a torque increase is made and the influencing of the limitation is only carried out in this case. For a torque reduction, a pregiven change limitation, which is as slight as possible, is then active for all operating states.

If the driver desires a torque increase, then an inquiry is made in step 106 as to whether the winter setting of the transmission is selected. If this is the case, then in step 108 a check is made as to whether a brake intervention by the drive slip control is active. If this is the case, at least one change limitation, for example the change limitation of the driver command, is set to a first value K1, in the opposite case, to a second value K2 (see steps 110 and 112). Here, lowpass filters are utilized having changing constants wherein K1, K2, et cetera represent these constants. The driver command change (and therefore the torque change) is then more greatly limited with K1 than with K2.

If no winter setting was made, then a check is made in step 114 as to whether a brake intervention of the drive slip control is active or if the drive slip control recognizes the danger of a low p-value. If this is the case, then the at least one change limitation is set to a value K3 (step 116) and, in the opposite case, to a value K4 (step 118) in dependence upon the type of driver. The value K4 is then read out of a characteristic line or a table on which it is stored in dependence upon the type of driver or the setting of the transmission.

After steps 110, 112, 116 or 118, the subprogram is ended and repeated after a given time.

The filtering of the driver command on the basis of the K values takes place in another subprogram.

In the preferred embodiment shown in FIG. 2, the input of the limit values for each torque change is carried out in increasing direction. In other embodiments, the filtering of the torque change is carried out only in specific operating situations, for example, when there is a change from or into the idle position of the operator-controlled element or for a transition from an overrun operation to a traction operation of the drive unit as well as for detected torque fluctuations.

In addition to the filtering of the driver command or of the desired value for at least one power parameter of the drive unit according to FIG. 2, at least one actuating variable, for example, the drive signal for an electrically actuable throttle flap is correspondingly filtered in dependence upon the supplied information. Furthermore, it can be provided that the constants of controllers (for example, the constants of the torque controller or position controller or the constants of an anti-bucking controller) can be changed in dependence upon the supplied additional information in such a manner that, for the sporting performance of the vehicle, which is pregiven by the driver, a rapid torque buildup takes place and a softer torque buildup takes place for pregiven comfortable economic driving.

The corresponding steps are not necessary if the measures with respect to winter adjustment and/or ASR status are not provided.

Figure 3A:
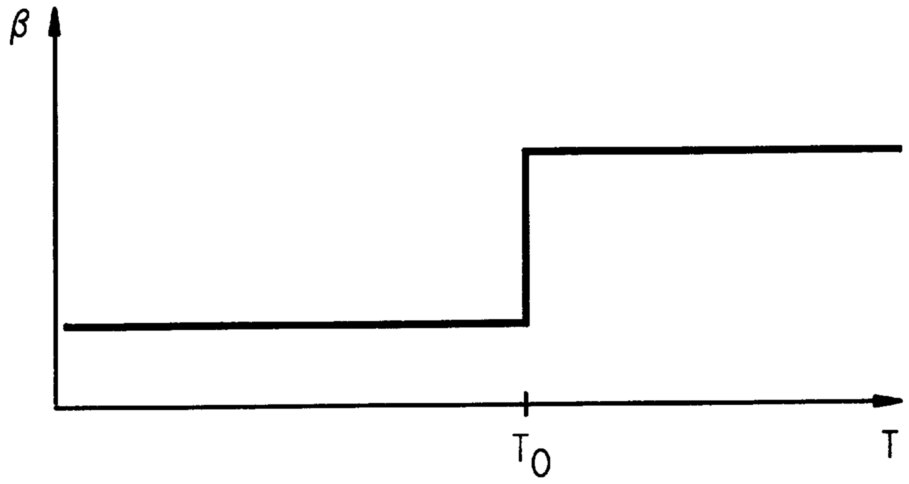
FIGS. 3*a* and 3*b* finally show time diagrams of this preferred embodiment.
Figure 3B:
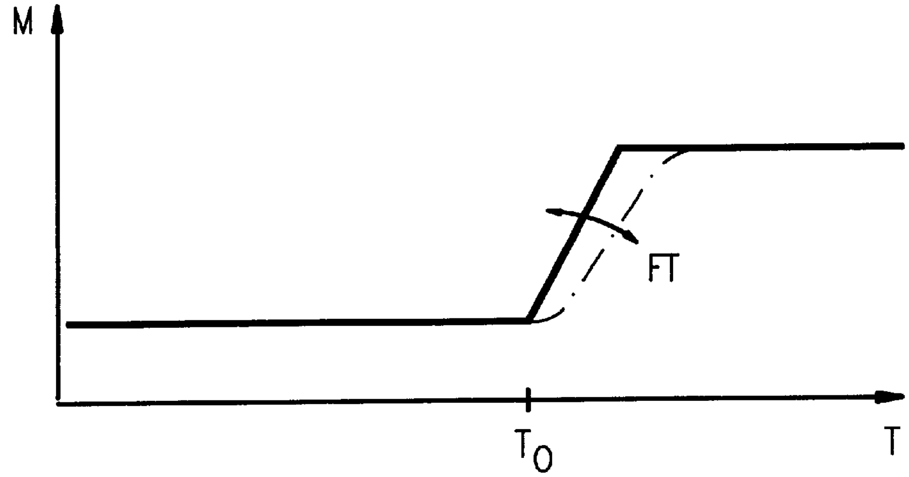

An example for the operation of the solution of the invention is shown in FIG. 3. FIG. 3*a* shows the time-dependent trace of the degree of actuation of the operator-controlled element; whereas, FIG. 3*b* shows the time-dependent trace of the engine torque. At a time point T0, the driver actuates the operator-controlled element (FIG. 3*a*) out of the rest position thereof. Correspondingly, and in accordance with FIG. 3*b*, torque is built up starting at time point T0. The rapidity of this torque buildup is influenced by suitable measures (filtering of the following: the degree of actuation, the driver command derived from the degree of actuation, a drive signal for adjusting a power parameter of the drive unit, via a corresponding selection of the constants of an adjusting controller). If information is present as to a sporty performance of the driver, a rapid torque buildup takes place (see the solid line in FIG. 3*b*); whereas, a softer torque buildup is undertaken while avoiding vibrations (see broken line trace) with an economic performance of the driver with a view toward driving comfort or for an actuation of the winter key or for a control intervention of a drive slip control. Also, for a sporty type of driver, the limitation permits a rapid change of torque and, for an economically orientated type of driver and/or for a winter setting of the transmission, a softer torque change is permitted.

What is claimed is:

1. A method for controlling a drive motor of a motor vehicle having a motor control system which influences the torque of said drive motor in dependence upon at least an operating variable (β, $N_{mot}$), the method comprising the steps of:

determining at least one of the type of driver (FT) driving said motor vehicle and at least one influence quantity of at least one other control system;

determining a driver command signal (FW) and filtering said driver command signal (FW) to limit said driver command signal (FW);

performing said filtering in dependence upon at least one of the following: the type of driver (FT) and said at least one influence quantity of at least one other control system; and, adjusting said torque (M) in dependence upon the filtered driver command signal (FW).

2. The method of claim 1, wherein said filtering permits at least one of the following: a rapid torque change for a sporting type of driver (FT) and a softer torque change for a winter setting of a transmission.

3. The method of claim 1, wherein at least one other control system is a system having constants adjusted in dependence upon the type of driver (FT) in the sense of a reduced influence of torque for a sporting type of driver and an intervention, which dampens unwanted vibrations, is adjusted for an economy-orientated driver performance.

4. The method of claim 1, wherein said at least one other control system is a drive-slip controller which transmits status information (ASR status) to said motor control system.

5. A method for controlling a drive motor of a motor vehicle having a motor control system which influences the torque of said drive motor in dependence upon at least an operating variable (β, $N_{mot}$), the method comprising the steps of:

determining at least one of the type of driver (FT) driving said motor vehicle and at least one influence quantity of at least one other control system;

determining a driver command signal (FW) and filtering said driver command signal (FW) to limit said driver command signal (FW);

performing said filtering in dependence upon at least one of the following: the type of driver (FT) and said at least one influence quantity of at least one other control system; and, adjusting said torque (M) in dependence upon the filtered driver command signal (FW) with said filtering only allowing a softer torque change when there is an active control intervention by a drive-slip controller.

6. An arrangement for controlling a drive motor of a motor vehicle having a motor control system which influences the torque (M) of said drive motor in dependence upon at least an operating variable (β, $N_{mot}$), the arrangement comprising:

means for detecting at least one of a driver type (FT) and at least one influence quantity of at least one other control system;

means for determining a driver command signal (FW) and for limiting said driver command signal (FW) by filtering;

said filtering being dependent upon at least one of the following: said driver type (FT) and said at least one influence quantity of at least one further control system; and, means for adjusting said torque (M) in dependence upon the filtered driver command signal (FW).

* * * * *